United States Patent [19]

DeMoully et al.

[11] 4,452,869
[45] Jun. 5, 1984

[54] BATTERY WITH IMPROVED TERMINAL STRUCTURE

[75] Inventors: Thomas R. DeMoully, Gainesville; Robert E. Rockey; John J. Strickland, both of Alachua, all of Fla.

[73] Assignee: General Electric Company, Gainesville, Fla.

[21] Appl. No.: 317,624

[22] Filed: Nov. 2, 1981

[51] Int. Cl.³ .................... H01M 2/20; H01M 6/10
[52] U.S. Cl. .................................. 429/94; 429/161; 429/178; 429/211
[58] Field of Search ............. 429/94, 178, 211, 161, 429/121

[56] References Cited
U.S. PATENT DOCUMENTS 3,960,603 6/1976 Morioka et al. .................... 429/211
4,320,182 3/1982 Sugalski ........................... 429/94

Primary Examiner—Donald L. Walton
Assistant Examiner—Gerard P. Rooney, Jr.
Attorney, Agent, or Firm—Henry J. Policinski

[57] ABSTRACT

An improved battery of the type having a spiral wound core (32) surrounded by a container (38) is disclosed in which an improved terminal tab (10-32, 44-50) is attached to the end of the core inserted into the container, the terminal tab comprising an outwardly extending tab member (24) bent back over the base (12) of the terminal tab and along the side of the core. A protrusion (46) on the base contacts the bent tab member to minimize compression by the tab member of the circumferential edge of the end of the battery core when the core has been inserted into the container. An improved method of assembling such a battery also is disclosed.

11 Claims, 8 Drawing Figures

BATTERY WITH IMPROVED TERMINAL STRUCTURE

TECHNICAL FIELD

The present invention relates to the structure and method of manufacture of batteries and particularly concerns a battery having an improved terminal geometry and a method of manufacturing such a battery.

BACKGROUND ART

For a number of years, nickel-cadmium and other types of batteries have been manufactured by winding on an arbor a sandwich of a positive plate, a negative plate and separator materials, to produce a battery core. For some battery types, the positive and negative plates are axially offset relative to one another so that the edge of a plate of one polarity projects from one end of the core and the edge of a plate of the opposite polarity projects from the other end of the core. Percussive welding procedures have been used to attach terminal tabs to the opposite ends of such battery cores, after which the core and tab assembly have been inserted into a surrounding metal container. Then, by inserting a welding electrode through a bore left in the center of the core upon its removal from the winding arbor, the terminal tab at the bottom of the core has been welded to the bottom of the container. The terminal tab at the top of the core has subsequently been connected to an appropriate cover assembly in the familiar manner.

Although this method of manufacture produces batteries which are quite suitable for their intended applications, the method has typically required a considerable amount of manual labor to complete the winding of the cores, the attaching of the terminal tabs and the inserting of the assembled core and tabs into the battery container. A need has existed for some time to simplify the structure of the batteries to facilitate automatic manufacture and assembly of their component parts.

DISCLOSURE OF THE INVENTION

An object of the present invention is to provide an improved battery of the type comprising a container surrounding a spiral wound core.

A further object of the present invention is to provide an improved terminal tab for use in such a battery, the tab being configured so as to eliminate the need to weld the tab to the battery container.

Still another object of the present invention is to provide an improved, simplified method of manufacturing such a battery.

These objects of the invention are given only by way of example. Thus, other desirable objectives and advantages inherently achieved by the disclosed invention may occur or become apparent to those skilled in the art. Nonetheless, the scope of the invention is to be limited only by the appended claims.

The improved terminal tab according to the invention is particularly suited for use in batteries of the type comprising a cylindrical container surrounding a spiral wound core having a cylindrical side wall and opposite ends. A terminal tab is attached to each end of the core to provide electrical connections to other parts of the battery. The terminal tab comprises an electrically conductive base portion adapted on one side thereof to be attached to an end of the core. An elongated tab member extends outwardly from the other side of this base portion and is adapted to be bent back along the base portion, around the circumferential edge or corner of the core and into contact with the side wall of the core. Operatively associated with the base portion and the tab member is a means for minimizing compression by the tab member of this edge or corner. Absent this means, insertion of the core and terminal tab into the battery container could cause the bent tab member to compress the edge or corner of the core sufficiently to result in a short circuit between the positive and negative plates of the core. In the assembled battery, the tab member is captured between the battery container and the side wall of the core, thus ensuring sufficient electrical contact.

In the preferred embodiment of the invention, the means for minimizing compression of the edge or corner of the core comprises at least one protrusion on the base portion, this protrusion extending outwardly from the base portion in position to contact the tab member when the tab member is bent back along the base portion. As a result, a space is maintained between the tab member and the edge or corner of the core so that unwanted compression is minimized. Although it is preferred to provide this protrusion on the base portion, it may also be provided on the tab member. Also, the function of the protrusion may be provided by a separate spacer positioned between the tab member and the base portion.

The method according to the invention concerns assembling an electrical battery of the type comprising a container surrounding a spiral wound core having a cylindrical side wall and opposite ends. At least one electrically conductive terminal tab is provided which comprises a base portion adapted to be attached on one side thereof to an end of the core, an elongated tab member extending outwardly from the other side of the base portion and means operatively associated with the base portion for minimizing compression by the tab member of the edge or corner of the core. This terminal tab is attached to an end of the core so that electrical contact is made with at least one plate of a single polarity. Then, the tab member is bent back along the base portion and into contact with the means for minimizing compression and the side wall of the coil. The coil and terminal tab assembly is then inserted into the battery container so that the outer end of the tab member is captured between the container and the side wall of the core and compression of the edge of the core is minimized.

BEST MODE FOR CARRYING OUT THE INVENTION

Figure 1:
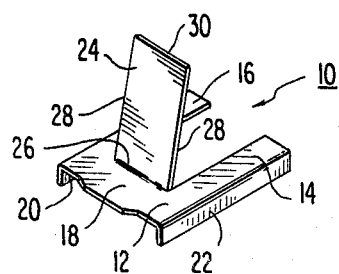
FIG. 1 shows a perspective view of a type of prior art terminal tab.

The following is a detailed description of the preferred embodiment of the invention, reference being made to the drawing in which like reference numerals identify like elements of structure in each of the several Figures.

FIG. 1 shows a perspective view of a terminal tab 10 of a type known in the prior art. A more or less U-shaped base portion 12 includes a pair of parallel leg portions 14, 16 having a transverse space therebetween. This space is chosen so that leg portions 14, 16 will straddle the central bore B left in the battery core following its removal from the winding arbor. (See FIG. 7, for example.) Leg portions 14, 16 extend from a rectangular base portion 18 and include a pair of downwardly extending contact edges 20, 22 which engage the coiled edge of the battery plate when the terminal tab is percussion welded to the wound core. An integral tab member 24 extends outwardly from edge 26 of base portion 18 and has essentially parallel side edges 28 and an outer end 30. Typically, such a terminal tab 10 is made from nickel or nickel-plated steel and is stamped from thin sheet stock.

Figure 2:
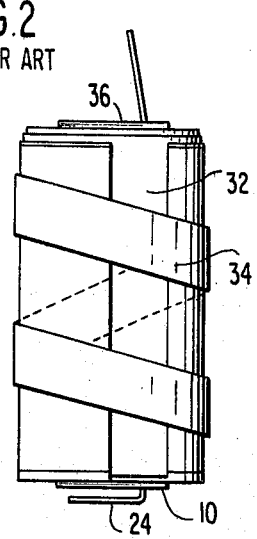
FIG. 2 shows an elevation view of a spiral wound battery core to which a terminal tab of the type shown in FIG. 1 has been attached.
Figure 3:
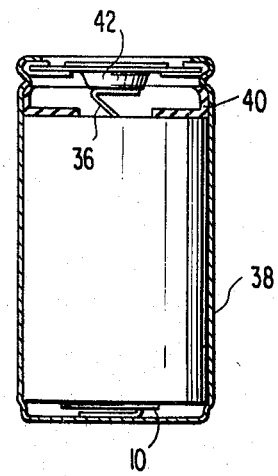
FIG. 3 shows an elevation section view of a battery comprising a core and terminal tabs of the type shown in FIG. 2.

FIG. 2 shows a spiral wound battery core 32 of conventional type. Such cores are made by assembling a sandwich of a positive plate, a negative plate and separator materials; axially offsetting the plates so that a plate of one polarity extends from one side of the sandwich and a plate of the opposite polarity extends from the other side of the sandwich; and then winding the sandwich on an arbor to produce a spiral core. A length of tape 34 can be used to keep core 32 from unwinding prior to insertion in the battery container. A positive terminal tab 36, of essentially the same geometry as that shown in FIG. 1, is percussion welded to the positive end of the battery and a terminal tab 10 is percussion welded to the negative end. Tab 24 is then bent to a position essentially parallel to the end of the core. Thereafter, the assembled core is inserted into a cylindrical metal container 38 of the type shown in FIG. 3. To ensure good electrical contact between terminal tab 10 and the bottom of container 38, a welding electrode is passed through the central bore of the core and into contact with tab 24. When a further electrode contacts the outside of container 38, a welding current may be passed through tab 24 to complete the connection. Assembly of the battery is completed by inserting an insulator assembly 40 and a cover and seal assembly 42, the latter of which makes contact with terminal tab 36 as shown in FIG. 3. Electrolyte is added prior to closing the cell.

Figures 4, 5:
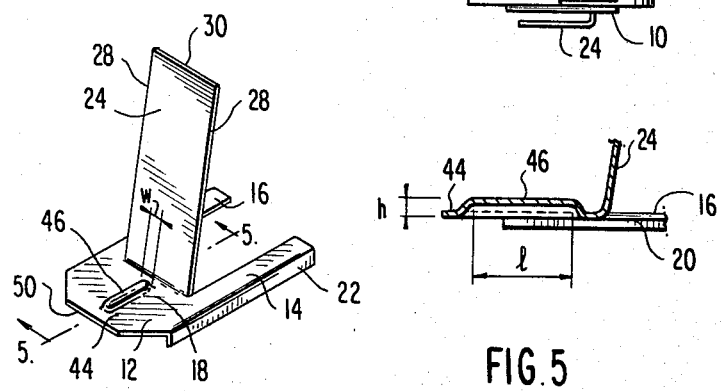
FIG. 4 shows a perspective view of a terminal tab according to the present invention.
FIG. 5 shows a section view taken along lines 5—5 of FIG. 4.

The improved battery terminal tab illustrated in FIGS. 4 and 5 permits simplified assembly of a battery by eliminating the need to weld the tab member 24 to container 38. Since access through the central bore B of the battery core is no longer required, a smaller winding arbor can be used so that somewhat longer positive and negative plates may be used to provide more active area. In the terminal tab illustrated in FIGS. 4 and 5, body portion 18 is provided with an extension 44 which extends away from the opening between leg portions 14, 16. On the outer surface of extension 44, an elongated, centrally located protrusion 46 is formed. When the terminal tab is made from 0.007-0.008 inch nickel sheet, protrusion 46 preferably has an overall height h of approximately 0.010 inch, an overall length l of approximately 0.250 inch and a transverse width w of approximately 0.040 inch. Different shapes or more than one protrusion also may be provided. The function of protrusion 46 is to minimize compression by tab member 24 of the circumferential edge or corner of battery core 32 when the core is inserted into container 38 and the outer end of tab member 24 is captured between the container and the side wall of the core. Although it is preferred that protrusion 46 be provided on extension 44 of body portion 18, it is also within the scope of the invention to provide the protrusion on the lower portion of tab member 24 or to provide a separate spacer element to be positioned between tab member 24 and body portion 18 when tab member 24 is bent back along body portion 18.

Figure 6:
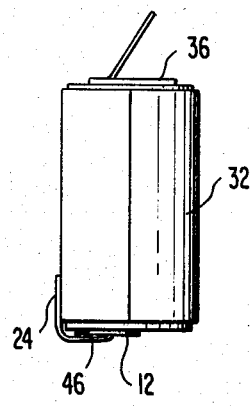
FIG. 6 shows an elevation view of a spiral wound battery core to which a pair of terminal tabs according to the invention have been attached.
Figure 7:
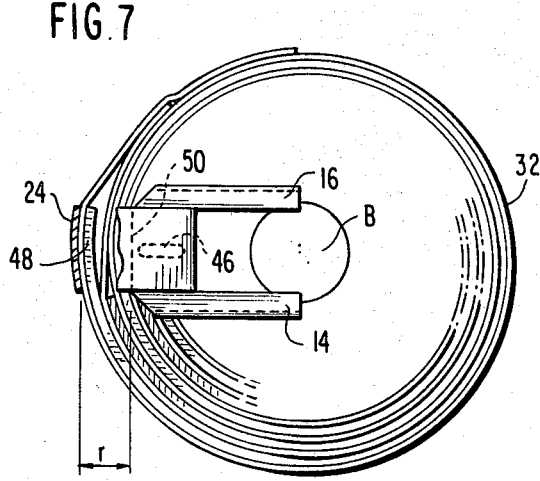
FIG. 7 shows an enlarged view of the bottom end of the core illustrated in FIG. 6.

As shown in FIGS. 6 and 7, the improved terminal tab illustrated in FIGS. 4 and 5 is attached to the lower end of core 32 by percussion welding, after which tab member 24 is bent back along base portion 18 into contact with protrusion 46, around the edge or corner of core 32 and into contact with the side wall of core 32. If desired, two of such terminal tabs may be attached to one or both ends of the core. Preferably, tab member 24 is positioned so that it contacts the side wall of core 32 at the overlap region 48 where the negative plate extends beyond the positive plate to contact the previous turn of negative plate. Thus, should any compression of the circumferential edge of core 32 occur, it will cause a portion of the negative plate to contact another portion of the negative plate and will not result in short circuiting. Preferably, the outer edge 50 of the terminal tab is positioned with a radial clearance r from the circumference of core 32, this clearance being no more than approximately 5% of the diameter of core 32.

Figure 8:
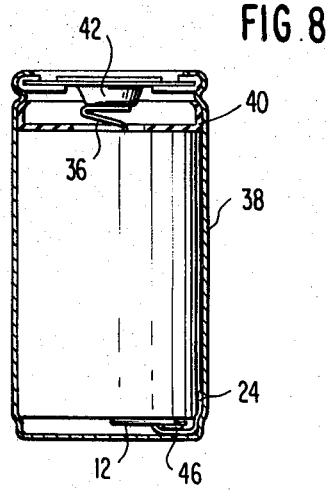
FIG. 8 shows an elevation section view of a battery embodying the core and terminal tabs illustrated in FIG. 6.

When the spiral wound core illustrated in FIGS. 6 and 7 is inserted into a battery container as shown in FIG. 8, tab member 24 is captured between container 38 and the side wall of core 32, as illustrated. Movement of the core into container 38 tends to pull tab member 24 into contact with the circumferential edge or corner of core 32; however, the presence of protrusion 46 on the terminal tab minimizes compression by tab member 24 of the circumferential edge of the core.

Having described our invention in sufficient detail to enable those skilled in the art to make and use it, we claim:

1. An improved terminal tab for use in batteries of the type comprising a container surrounding a spiral wound core having a cylindrical side wall and opposite ends, at which ends electrical connections are made, said tab comprising:

an electrically conductive base portion adapted on one side thereof to be attached to an end of said core;

an elongated tab member extending outwardly from the other side of said base portion, said tab member being adapted to be bent back along said base portion and into contact with said side wall of said core; and means operatively associated with said base portion and said tab member for minimizing compression by said tab member of the circumferential edge of said end of said core when said core is inserted into said container and the outer end of said tab member is captured between said container and said side wall.

2. An improved terminal tab according to claim 1, wherein said minimizing means comprises at least one protrusion on said base portion in position to contact said tab member when said tab member is bent back along said base portion.

3. An improved terminal tab according to claim 1, wherein said tab member is integral with said base portion.

4. An improved terminal tab according to claim 1, wherein said base portion comprises an essentially flat, U-shaped member having a pair of leg portions joined by a body portion, said tab member being attached to said body portion between said leg portions.

5. An improved terminal tab according to claim 4, wherein said minimizing means comprises at least one protrusion on said base portion in position to contact said tab member when said tab member is bent back along said base portion.

6. An improved terminal tab according to claim 5, wherein said tab member is integral with said base portion.

7. An improved battery, comprising:
a spiral wound core of positive and negative plates, said core having a cylindrical side wall and opposite ends;
a container surrounding said core; and
at least one electrically conductive terminal tab comprising a base portion attached on one side thereof to an end of said core, an elongated tab member extending outwardly from the other side of said base portion, said tab member being bent back along said base portion and into contact with said side wall of said coil; and means operatively associated with said base portion for minimizing compression by said tab member of the circumferential edge of said end of said core when said core is inserted into said container and the outer end of said tab member is captured between said container and said side wall.

8. An improved terminal tab according to claim 7, wherein said minimizing means comprises at least one protrusion on said base portion in position to contact said tab member when said tab member is bent back along said base portion.

9. An improved terminal tab according to claim 8, wherein said tab member is integral with said base portion.

10. An improved terminal tab according to claim 9, wherein said base portion comprises an essentially flat, U-shaped member having a pair of leg portions joined by a body portion, said tab member being attached to said body portion between said leg portions.

11. The invention as set forth in claim 7 wherein one of said plates extends beyond the other of said plates at said cylindrical side wall so as to overlap the previous turn of said one of said plates, said tab member being in contact with said side wall at said overlap.

* * * * *